United States Patent [19]
Cochrane

[11] Patent Number: 5,177,721
[45] Date of Patent: Jan. 5, 1993

[54] COIN OPERATED VIDEO MACHINE

[76] Inventor: Michael J. Cochrane, 2199 Fourth Ave. West, Owen Sound ON N4K 4Y6, Canada

[21] Appl. No.: 671,072

[22] Filed: Mar. 18, 1991

[51] Int. Cl.⁵ .................................................. G11B 5/00
[52] U.S. Cl. .................................... 369/34; 360/72.1; 360/74.4; 358/335
[58] Field of Search ....................... 369/34, 30, 32, 58, 369/44.11; 360/132, 93, 95, 96.1, 14.1, 72.1, 72.2, 72.3, 74.2, 74.3, 74.4, 10.3, 74.1; 358/335

[56] References Cited

U.S. PATENT DOCUMENTS

| | | | |
|---|---|---|---|
| 4,578,718 | 3/1986 | Parker et al. | 360/10.3 |
| 4,587,577 | 5/1986 | Tsunoda | 360/72.2 |
| 4,647,989 | 3/1987 | Geddes | 369/30 |

OTHER PUBLICATIONS

Happy Video brochure, (2 pages), Elekto-Mobiltechnik GmbH, Raubach, Germany, no date known.

Primary Examiner—Roy N. Envall, Jr.
Assistant Examiner—Muhammad Edun
Attorney, Agent, or Firm—Donald E. Hewson

[57] ABSTRACT

A coin operated video machine is provided, of the sort intended for stand-alone operation in shopping malls and the like. The machine includes a tape player with a tape playing mechanism, a coin operated switch, and a television monitor. Upon actuation of the coin operated switch, pre-recorded program material is viewed on the monitor. A plurality of discrete video programs is recorded seriatim on the video tape, each having a control track; and between each pair of pre-recorded video programs there is a non-program passage. When the non-program passage is encountered, the tape playing mechanism stops; and a new play mode is not initiated until the coin operated switch is once again actuated. The tail end of the video tape is such that when encountered, the tape playing mechanism will go into a rewind mode; and the front end of the tape has at least a short pre-recorded program material and control track so that, upon termination of the rewind mode a play mode is immediately initiated. Program material of any kind for which a prospective viewer will pay a nominal amount in coin to view may be pre-recorded on the video tape.

14 Claims, 3 Drawing Sheets

COIN OPERATED VIDEO MACHINE

FIELD OF THE INVENTION

This invention relates to coin operated video machines. In particular, the invention relates to coin operated video machines which operate in a stand-alone mode, usually located in such places as shopping malls and the like. A plurality of prerecorded video programs is recorded on a video tape within the coin operated video machine, and the pre-recorded video programs are separated one from another by non-program passages between them. The pre-recorded video programs may be cartoons or other short programs of interest to persons who will pay a small amount of money in coin to actuate a coin operated switch to place the video machine in operation for the period of one pre-recorded program. The machines may be packaged as part of a small kiosk, whereby a private viewing area suitable only for one or two persons may be created for the use of patrons of the machine who deposit coins to activate the machine.

BACKGROUND OF THE INVENTION

Most shopping malls or shopping centres may be open to the public for many hours each day, if not being always open for public access. The shopping malls and centres are frequented by patrons and customers of the stores located in them, and quite often those patrons and customers may attend at the shopping mall or centre in family groupings.

Often, the parents of children who accompany them may wish to find a location at which their children may safely amuse themselves for a few moments while the parent rests, has a cup of coffee, or visits a nearby store. Many parents are reluctant for their children to attend at video arcades, especially when those children are pre-teenagers, but may have no reluctance to permit the children to spend a few moments and a few small coins watching cartoons or other interesting or entertaining video programs.

There are very many short cartoon programs, and other moving picture programs, which are in the public domain or which can be licensed for commercial exhibition quite inexpensively. Such programs may range in playing length from three or four minutes up to as much as eight or ten minutes.

For many years, there have been available in shopping malls or shopping centres small kiosks operated by independent operators, or in some instances operated by the owners or managers of the shopping malls and the like, in which endless loops of 8 mm film may be placed in a projector to be activated by a coin operated switch. However, such film projectors and the program material on the films have very poor quality, usually no sound, and are subject to frequent breakdown of the projector or breakage of the film. Moreover, in some instances rather than an endless loop of film being used, a film may be wound on to a large reel, and operated by a timer. In such installations, placing a coin into a coin operated switch to begin operation of the film projector might result in the last few seconds of one program and the first two or three minutes of the next cartoon program, a circumstance which is not desirable and which leads to unhappy patrons. Moreover, those projectors require constant supervision, and rewinding of the film when it reaches its end.

Because of the availability of better quality video program material, either in the public domain or inexpensively, and because a video tape playing device of a video tape player and a television monitor would normally result in better quality viewing, an opportunity arises for placement of coin operated video machines in shopping malls and centres instead of the old film projectors, with much better quality program material and much better quality viewing for patrons. The present invention recognizes those opportunities, and provides for a coin operated video machine that can be obtained at relatively low capital costs but which can provide significant returns on investment because it is essentially maintenance free. Indeed, the only maintenance may be the usual preventive maintenance, clearance of coin boxes and checking counters, and changing video tapes to provide fresh program material for each site at which a coin operated video machine is located.

It is not, however, simply a case of recording a few programs, dropping the tape into a video tape player, connecting the video tape player to a television, and providing some kind of coin operated switch to start playback operations. To begin with, an ordinary tape player would require always to be set in its play mode, which probably cannot be accomplished without applying a jumper inside the device. If that occurs, however, an ordinary video tape player is incapable of rewinding the video tape if its control panel is constantly set in a play position. Still further, means must be provided to initiate operation, at full speed, and at the same time ensure that the television monitor is turned on and warmed up so as to begin to show the video program at the instant when the tape moves through the tape transport or tape playing mechanism of the tape player. Thus, much more specific requirements are made, especially in respect of the nature of the video tape player and the video tape which will be placed in it, in order to meet the operating characteristics of coin operated video machines of the present invention, as discussed above.

For example, all control of the play operation of the coin operated video machine must come from actuation of the coin operated switch; however, rewind operation of the video tape to place it back at its beginning so as to replay the program material that has been pre-recorded on it, is not permitted to be under the control of the coin operated switch. To do so would result in an unacceptable delay between actuation of a coin operated switch and the beginning of video play, if the patron of the machine has first to wait for the tape to be rewound.

Still further, means must be provided whereby each time a pre-recorded video program reaches its end, the video machine must recognize that event, so that the tape player will stop its operation and be placed into a rest or stop mode, ready to once again enter its play mode upon actuation of the coin operated switch.

In an improvement of the present invention, it is recognized that when a video tape of, for example, VHS format is capable of having recorded thereon 60 minutes or 90 minutes of much as 6 hours of pre-recorded program material (when replayed at the lowest tape speed), there may be a significant period of 3 or 5 minutes, or more, during which the video tape must be rewound to its beginning or front end. If a shorter tape is used, the rewind period is shorter, but is encountered much more frequently. Thus, it is desirable for means to be provided that preclude the coin operated video machine from operating during its rewind mode—so as to ensure full rewind of the video tape—and an auxiliary video program source may be provided so as at least to provide some video viewing on the monitor during tape rewind. Alternatives which make such provisions are discussed below.

Moreover, it may be desirable for an alternate video source to provide advertising opportunities for the merchants in a shopping mall or centre, or public service announcements and the like. Thus, when a patron of the video machine is not occupying its surrounding kiosk to the exclusion of all other persons, the alternate video source operates. This arrangement is also provided for, as discussed below.

Certain combined video monitor and video tape player machines are available on the market, which are used very often by marketing consultants at trade shows, and in such surroundings as department stores, where a specific (usually short) promotional video tape may continuously be played to promote a certain product. Other circumstances include the simple presentation of an ongoing video recording of an otherwise incessant program source such as a seascape or a tank of tropical fish. In the first instance, a particular promotional program may be recorded and placed in the tape player mechanism of the machine, and the machine set so that at the end of the promotional pre-recorded segment a non-program segment is encountered; and the non-program segment immediately puts the tape playing mechanism in rewind mode so that the video tape rewinds to its beginning and the program material is re-played. A typical circumstance may be the promotion of a new perfume, for example.

In the other mode of playback possible in these commercially available machines, a control is set so that when the end of the tape is reached, the tape rewinds and begins to re-play the program material once again. A typical circumstance may be where a video tape recording of a movie is being promoted and the movie continues simply to be re-played, or where a restful view such as a seascape or tropical fish tank may be required for any reason.

A typical machine of the sort described above, having all of the limitations noted above, is available and identified as PANASONIC (TM) model AG-500. However, that machine is not capable of being operated in the manner described above to play sequential video program material that has been pre-recorded seriatim on a video tape, without very extensive modifications. Test machines in keeping with the present invention have been manufactured from those machines noted immediately above, with very extensive modifications, so as to operate in keeping with the above description. Commercial machines according to the present invention are more fully discussed hereafter.

BRIEF DESCRIPTION OF THE DRAWINGS

The present invention will now be described in association with the accompanying drawings, in which.

DESCRIPTION OF THE PREFERRED EMBODIMENTS

Figure 1:
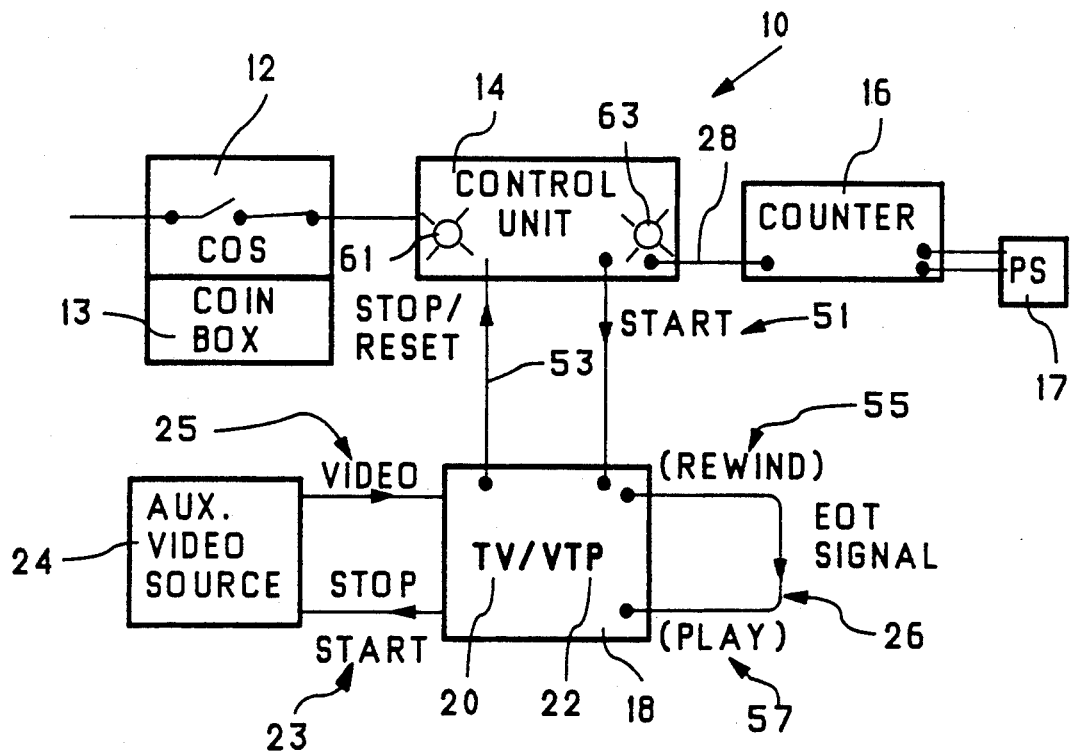
FIG. 1 is a typical schematic of a simple coin operated video machine in keeping with the present invention.

A simple coin operated video machine in keeping with the present invention is shown generally at 10 in FIG. 1. It includes, as its principal components, a coin operated switch 12, a control unit 14 (shown for simplicity as being an external device), a counter 16, and a combined unit 18 identified as a TV/VTP. The TV portion 20 is a TV or video monitor; the video tape player portion is identified at 22, and includes a tape player mechanism.

Additionally shown in FIG. 1 are an auxiliary video source 24, and a line 26 which indicates the presence of an end-of-tape (EOT) signal.

Figure 2:
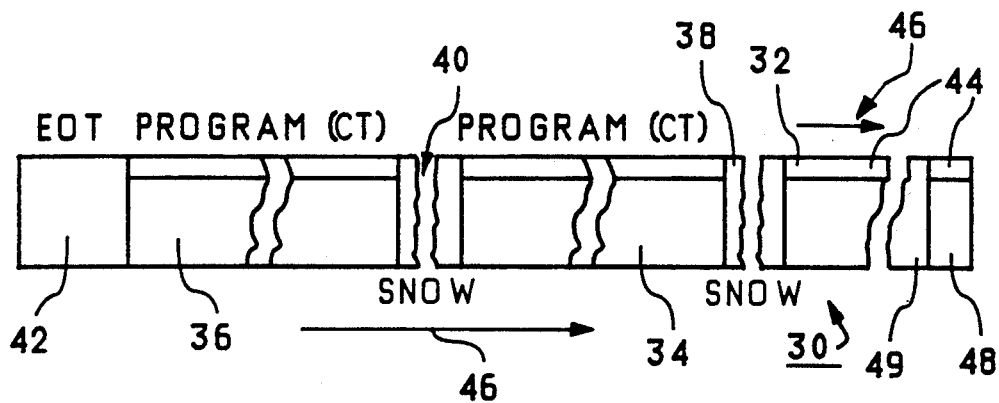
FIG. 2 is a simple schematic showing the nature of pre-recorded program and non-program segments on a video tape so as to be useful in machines according to the present invention.

Briefly, the coin operated video machine 10 is intended to play pre-recorded video program material on video tapes. FIG. 2 shows a typical tape 30 having pre-recorded program segments 32, 34, and 36 recorded seriatim. Typically, each pre-recorded program segment has different program material and is of a different length than all of the other pre-recorded program segments. Between the program segments are non-program segments, shown typically at 38 and 40. The end of the video tape 30 has a different segment identified at 42, the nature of which is significantly different than that of the video tape material, as discussed hereafter.

The video tape player portion 22 has a video tape playing mechanism in it, comprising a tape transport through which a video tape passes in keeping with the usual arrangement for video tape cassettes. A video tape cassette is placed in the video tape playing mechanism of video tape player 22.

The video tape playing mechanism has three modes of operation. Its first mode of operation is the play mode, in which pre-recorded program material on the video tape is played for viewing on the video monitor 20. The second mode is the stop mode, in which the video tape is not being played; and the third mode is the tape rewind mode, in which the video tape is rewound within the video tape playing mechanism.

Figure 3:
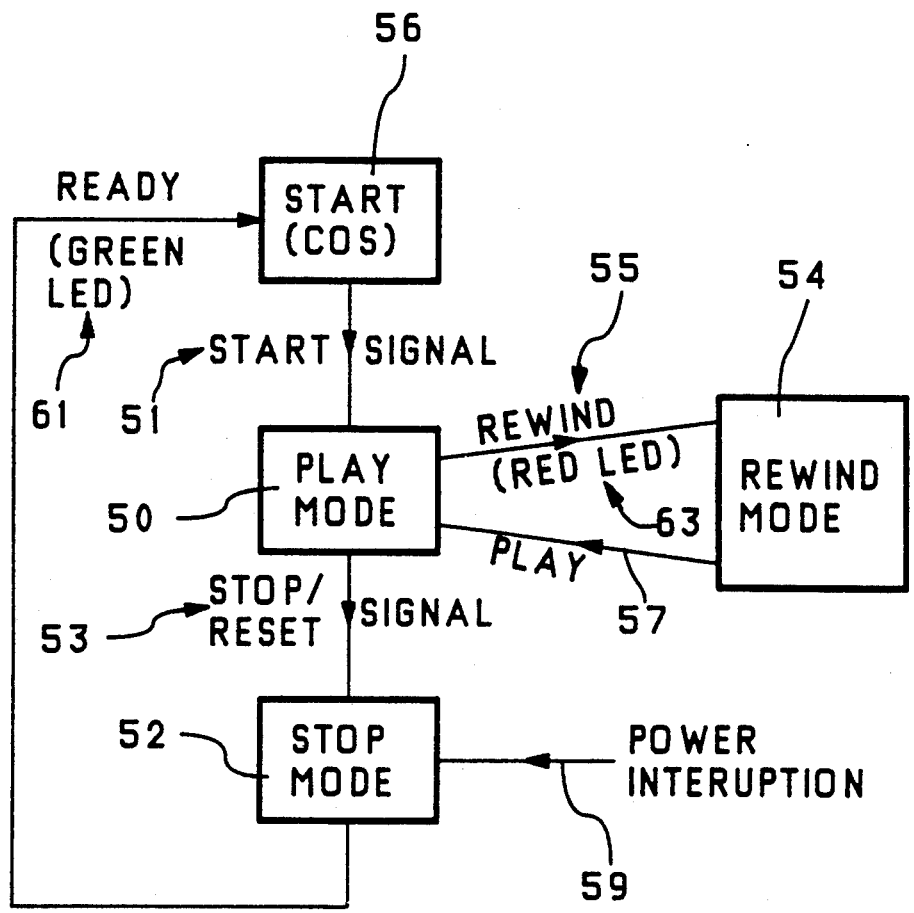
FIG. 3 is a sequence diagram showing simple operation of a coin operated video machine according to the present invention.

Referring now to FIG. 3, the play mode is shown in the sequence diagram at 50, the stop mode is shown at 52, and the rewind mode is shown at 54. Other sequences, and the operating lines between them, are discussed hereafter.

Returning to FIG. 2, each program segment 32, 34, or 36, has with it a control track 44, which has the same nature for each program segment although the program material is different in each case. The pre-recorded control track 44 is readable by the tape playing mechanism of the video tape player 22 so as to maintain the video tape player 22 when it is in its play mode 50 in that play mode for so long as the control track is present. However, it is noted that the non-program passages or segments do not have a pre-recorded control track. At the beginning or front end of the video tape 30—the direction that the video tape follows when the video tape player is in its play mode is indicated by arrows 46—there is a further short pre-recorded video program 48, having its own control track 44, and followed by a further non-program segment 49.

The coin operated switch 12 is actuated by placing a coin or coins of suitable denomination in it. At that time, the start sequence 56 in FIG. 3 is initiated, and a start signal as shown at 51 initiates the play mode 50. As each program segment passes through the video tape playing mechanism of the video tape player 22, the play mode 50 continues for so long as the control track 44 is present. However, when any of the non-program passages are encountered, a stop/reset signal 53 is sent by the video tape playing mechanism to place the video tape player in its stop mode 52. It should be noted that, in general, a timeout circuit is provided in the video tape player 22 such that the stop signal 53 is not generated until a predetermined passage of time—usually about 3.0 seconds—has gone by.

When the video tape 30 reaches its tail end, segment 42 is encountered. That segment 42 is, for example, transparent so that a light sensitive operating switch may be activated only when light passes through the transparent segment 42. In any event, the nature of the segment 42 is such that its presence is noted by the video tape playing mechanism of video tape player 22, and a rewind signal 55 is generated whereby the video tape player is forced to go into its tape rewind mode 54. However, when the rewind mode 54 ends, the video tape 30 has been rewound to its beginning or front end, at which point the pre-recorded video program segment 48 is encountered. That immediately places the video tape player 22 in its play mode once again, as noted by the signal at 57. However, in general the pre-recorded video program segment 48 is quite short in duration, so that after only a few seconds or so the non-program segment 49 is encountered and a new stop/resets signal 53 is generated to place the video tape player once again in its stop mode 52.

In the event that a power interruption has been encountered, as shown at 59 in FIG. 3, the coin operated video machine 10 is arranged so that upon power being restored, the machine is in its full stop mode 52. In that case, only operation of the coin operated switch 12 will re-initiate the play mode 50 of the machine.

It is convenient that when the stop mode 52 has been encountered, a visual signal such as a green LED may be illuminated. This is shown at 61 in FIG. 3, and is indicative of a ready state of the machine. Likewise, when the machine is in its rewind mode 54, a red LED as indicated at 63 may be illuminated.

It will be noted that the LED's are also shown in FIG. 1, as are all of the sequence signals. However, in FIG. 1 there is also shown a counter 16, connected to the control unit 14 by line 28. The counter 16 is arranged to operate each time the coin operated switch 12 is actuated, so that the owner or operator of the machine may determine the number of times that the machine has been used. The operation of the counter is quite independent of the number and value of the coins that may be in a coin box 13 associated with the coin operated switch 12. This is because the coin box 13 may be emptied quite frequently, but it may be valuable to the owner or operator, or the mall manager, to know the cumulative total of the number of times that the coin operated video machine of the present invention has been operated by its patrons. For that reason, an independent power supply 17 may be provided for the counter 16. Moreover, an interlock can be arranged so that a relay in the counter 16 must first close before the coin operated switch 12 can be operable.

It follows, therefore, that the power supply to the coin operated video machine is always present. However, operation of the machine is effected only by actuation of the coin operated switch 12, by depositing coinage in the proper amount.

There may also be provided an auxiliary video source 24. Its purpose is simply to provide a video signal to the video monitor 20 when the video tape player 22 is not operating. Thus, for example, the auxiliary video source 24 might be a solid state video chip, a computer floppy disk, a video disk (such as a laser disk), or even another video tape player. It could operate at all times when the video tape player 22 is not operating, and thereby provide advertisements for merchants in the shopping mall where the video machine is located, public service announcements, and the like. Arrangements are made, of course, that immediately upon the video tape player 22 being put into its play mode 50, a signal 23 is sent along a stop/start line to the auxiliary video source 24, to terminate the video signal 25. When the video tape player 22 again goes into its stop mode 52, a further signal is sent along the stop/start signal line 23 to toggle the auxiliary video source 24 once again into operation, to send a video signal 25 to the video monitor 20.

Figure 4:
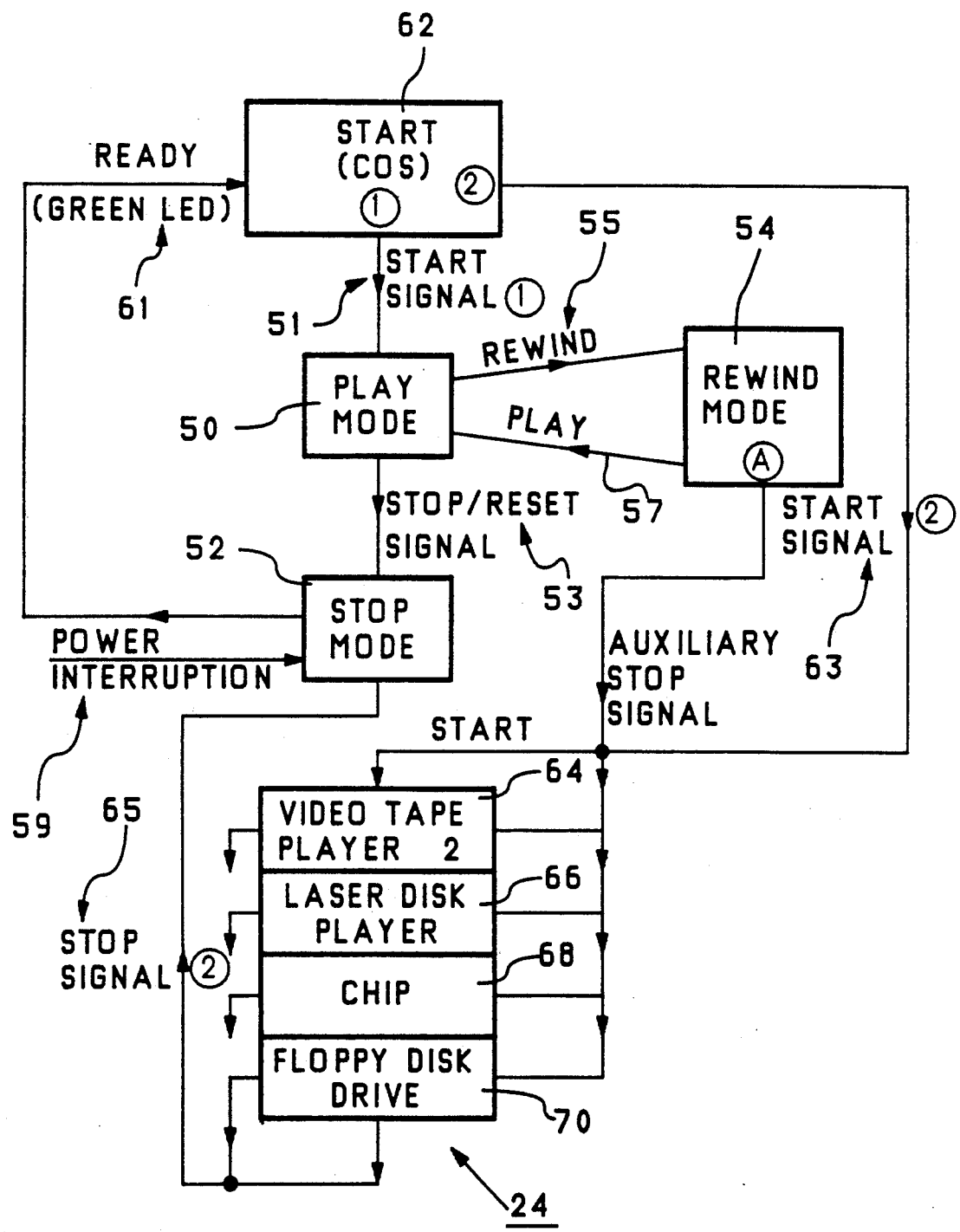
FIG. 4 is a sequence diagram of a more complicated video machine, having considerable other alternative features, but otherwise being substantially as defined herein.

It might also be noted that the coin operated switch 12 of FIG. 1 might be substituted by a coin operated switch 62 of FIG. 4. It will be noted that the upper portion of FIG. 4 replicates FIG. 3, and that like reference numerals are used. However, it will be noted that the coin operated switch 62 may have two modes identified as "1" and "2", being such that the value of coins deposited—say, within a particular period of time, or using specific coinage—will invoke either operating mode "1" or operating mode "2". When operating mode "1" is invoked, the operation of the circuits and the apparatus is as described above with reference to FIG. 3. However, the sequence diagram of FIG. 4 illustrates that in the event of operating mode "2" being invoked, a further start signal 63 is generated to the auxiliary video source 24. That auxiliary video source 24 may be a second video tape player 64, a laser disk player 66, a video chip 68, or a floppy disk drive 70. In any event, the start signal 63 invokes operation of one or the other of the alternative auxiliary video sources shown in FIG. 4 (if present) and a stop signal 65 is generated to ensure that the video playing mechanism of the video tape player 22 is in its stop mode 52.

Obviously, when a coin operated video machine of the present invention is placed in a kiosk or other commercial embodiment, all of the components except the video screen of the TV monitor 20 are hidden from view and inaccessible to the public. Suitable cabinetry, with locks and other security means are provided accordingly.

Moreover, it is clear that the auxiliary video source—or more especially, any one of the prospective auxiliary video sources including a laser or other video disk player, a videochip, or a floppy disk drive—might be substituted for the primary video tape player. Thus, operation of the video machine of the present invention may invoke, in the first instance, operation of a video source other than a video tape player per se.

There has been described a coin operated video machine of the sort that may be found particularly in shopping malls and the like, where relatively short video programs may be played by the deposit of modest amounts of coin in a coin operated switch to actuate the play mode of the machine. Specific examples have been discussed, but it is clear that the spirit and scope of the present invention are defined by the appended claims.

What is claimed is:

1. A coin operated video machine for playing pre-recorded video program material on a video tape: said video machine comprising, in combination a video tape, a video tape player having a video tape playing mechanism, a coin operated switch in series with said video tape player, and a television monitor connected to said video tape player;

wherein said video tape player has a video tape playing mechanism in which a video tape is placed to be played; and wherein said video tape playing mechanism has a tape transport means having a play mode during which pre-recorded program material on said video tape is played for viewing; said tape transport means further having means to initiate a stop mode during which said video tape is not being played, and means to initiate a tape rewind mode during which said video tape is rewound;

said video tape playing mechanism having a control track reading means incorporated therein;

there being a plurality of discrete video programs that are pre-recorded seriatim on said video tape, with a plurality of non-program passages being arranged so that there is one non-program passage between consecutive video programs, and wherein each of said non-program passages is at least of a pre-determined length; each of said pre-recorded video programs having with it a pre-recorded control track which is readable by said control track reading means incorporated in said tape playing mechanism of said video tape player when said tape playing mechanism is in its play mode, and wherein said control track reading means controls said tape transport means so as to maintain said video tape player in said play mode for so long as said control track is present;

each of said non-program passages being characterized by the absence of a pre-recorded control track;

trigger means associated with said control track reading means to initiate the stop mode of said tape transport means when said control track reading means notes the absence of a pre-recorded control track on said video tape;

said video tape having a front end which is the first part of a completely wound tape to be played, said front end having at least a short pre-recorded video program thereon from the beginning of said tape;

said video tape having a tail end at the end of said video tape remote from said front end, said tail end being characterized in that it is different than the rest of said video tape;

said tape playing mechanism having tail end recognition means to recognize said tail end of said video tape, and rewind means to cause said tape playing mechanism to go into its tape rewind mode;

said coin operated switch being in series with said video playing mechanism to put said video tape playing mechanism into its play mode when said coin operated switch is actuated; and said television monitor being connected to said video playing mechanism for viewing each video program when said video tape player is in its play mode.

2. The coin operated video machine of claim 1, further having a counter to maintain a record count of each operation of said coin operated switch and is electrically connected thereto.

3. The coin operated video machine of claim 1 further including an auxiliary video source and means to initiate operation of the same; wherein when said video tape playing mechanism is in its tape rewind mode, said means to initiate operation of said auxiliary video source causes said auxiliary video source to provide a video signal to said television monitor.

4. The coin operated video machine of claim 1 further including an auxiliary video source and means to initiate operation of the same; wherein when said video tape playing mechanism is in its stop mode, said means to initiate operation of said auxiliary video source causes said auxiliary video source to provide a video signal to said television monitor.

5. The coin operated video machine of claim 1, further having means for monitoring said coin operated switch, and signal means to give a visual signal to indicate whether said coin operated switch can be actuated.

6. The coin operated video machine of claim 1, further having lamp means to give a visual signal when said tape playing mechanism is in its tape rewind mode.

7. The coin operated video machine of claim 1, wherein a further auxiliary video source is provided to be a source of at least one further pre-recorded video program;

and wherein said coin operated switch can produce two different output signals depending on the value of coins used to operate it;

whereby either said video tape player or said further auxiliary video source is operated in a play mode so as to provide a video signal to said television monitor.

8. The coin operated video machine of claim 1, wherein each of said non-program passages has video snow.

9. The coin operated video machine of claim 1, wherein the prerecorded control track comprises a tone or other signal which is not noticeable to the viewer during video playback.

10. The coin operated video machine of claim 3, where said auxiliary video source is chosen from the group consisting of a prerecorded video solid state chip, a second video tape player, a computer floppy disc, a video disc.

11. The coin operated video machine of claim 4, where said auxiliary video source is chosen from the group consisting of a prerecorded video solid state chip, a second video tape player, a computer floppy disc, a video disc.

12. The coin operated video machine of claim 7, where said auxiliary video source is chosen from the group consisting of a prerecorded video solid state chip, a second video tape player, a computer floppy disc, a video disc.

13. The coin operated video machine of claim 1, wherein each prerecorded program material has a playing time of at least three minutes; and wherein each non-program passage on said video tape has a playing time of at least three seconds at the same tape speed as the immediately preceding video program segment.

14. The coin operated video machine of claim 2, wherein said counter is an electrically driven counter having an external power supply which is independent of the power supply for said video tape player and said television monitor.

* * * * *